(12) United States Patent
Rivera

(10) Patent No.: US 10,575,672 B2
(45) Date of Patent: Mar. 3, 2020

(54) COLD COFFEE BREWER

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 113 days.

(21) Appl. No.: 15/702,727

(22) Filed: Sep. 12, 2017

(65) Prior Publication Data

US 2019/0075957 A1   Mar. 14, 2019

(51) Int. Cl.
| | |
|---|---|
| *A47J 31/00* | (2006.01) |
| *A23F 5/26* | (2006.01) |
| *A47J 31/06* | (2006.01) |
| *A47J 31/44* | (2006.01) |
| *A47J 31/20* | (2006.01) |

(52) U.S. Cl.
CPC ............ *A47J 31/002* (2013.01); *A23F 5/26* (2013.01); *A23F 5/262* (2013.01); *A47J 31/005* (2013.01); *A47J 31/0636* (2013.01); *A47J 31/20* (2013.01); *A47J 31/4403* (2013.01)

(58) Field of Classification Search
CPC .... A47J 31/002; A47J 31/005; A47J 31/4403; A47J 31/0636; A23F 5/26
See application file for complete search history.

(56) References Cited

U.S. PATENT DOCUMENTS

| | | | | |
|---|---|---|---|---|
| 1,648,983 A | * | 11/1927 | Elrod ...................... | A47J 31/22 210/196 |
| 1,887,848 A | * | 11/1932 | Peirce ..................... | A47J 31/20 99/282 |
| 1,984,047 A | * | 12/1934 | Thieme ................... | A47J 31/20 426/433 |
| 2,858,762 A | * | 11/1958 | Wade ...................... | A47J 31/20 99/287 |
| 5,265,517 A | * | 11/1993 | Gilbert ..................... | A23F 5/26 99/280 |
| 5,472,719 A | | 12/1995 | Favre | |
| 5,957,035 A | | 9/1999 | Richter | |
| 6,272,974 B1 | * | 8/2001 | Pascotti ............. | A47J 31/0615 99/279 |
| 7,322,274 B2 | | 1/2008 | Wang | |

(Continued)

FOREIGN PATENT DOCUMENTS

| | | | |
|---|---|---|---|
| CN | 103356068 | * | 10/2013 |
| DE | 4302899 | * | 3/1994 |

(Continued)

OTHER PUBLICATIONS

English Translation for CN103356068 published Oct. 2013.*
English Translation for DE4302899 published Mar. 1994.*

*Primary Examiner* — Anthony J Weier
(74) *Attorney, Agent, or Firm* — IP Strategies

(57) ABSTRACT

A cold coffee brewing device reduces the time required to produce cold brewed coffee. The cold brewer includes a container, preferably transparent, and an elongated brewing material holder suspended from a lid of the container. The brewing material holder is enclosed in a mesh to retain brewing material in the brewing material holder. In one embodiment, the mesh is a fine nylon mesh or a 75 micron opening nylon mesh. The lid includes a mechanism to rotate the brewing material holder. The container is filled with water and the brewing material holder is filled with brewing material. Movement of the brewing material submerged in water substantially reduces the time required for cold brewing.

20 Claims, 7 Drawing Sheets

(56) References Cited

U.S. PATENT DOCUMENTS

| | | | |
|---|---|---|---|
| 7,353,751 B2 | 4/2008 | Takizawa | |
| 8,857,317 B2 | 10/2014 | Manser et al. | |
| 2007/0056447 A1* | 3/2007 | Swartz | A47G 19/2205 |
| | | | 99/287 |
| 2009/0280219 A1 | 11/2009 | Yoakim et al. | |
| 2014/0202338 A1 | 7/2014 | Remo et al. | |
| 2015/0099045 A1 | 4/2015 | Perentes et al. | |
| 2015/0327718 A1 | 11/2015 | Burrows | |
| 2016/0367072 A1* | 12/2016 | Boone | A47J 31/005 |
| 2017/0332824 A1* | 11/2017 | Ballezzi | A47J 31/002 |
| 2019/0059634 A1* | 2/2019 | Jacobs | A47J 31/0689 |

FOREIGN PATENT DOCUMENTS

| | | |
|---|---|---|
| EP | 2119383 A1 | 11/2009 |
| EP | 2133008 A1 | 12/2009 |
| WO | 2013160269 A1 | 10/2013 |

\* cited by examiner

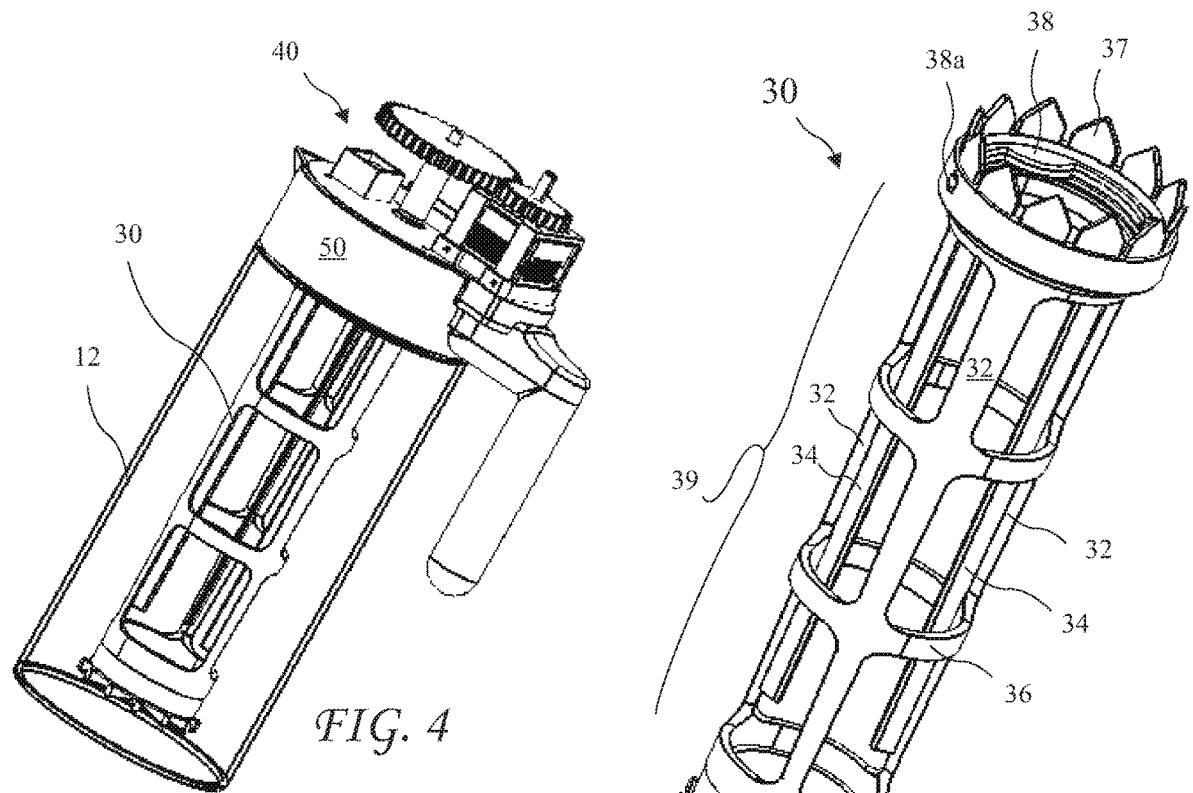
FIG. 4
FIG. 5A
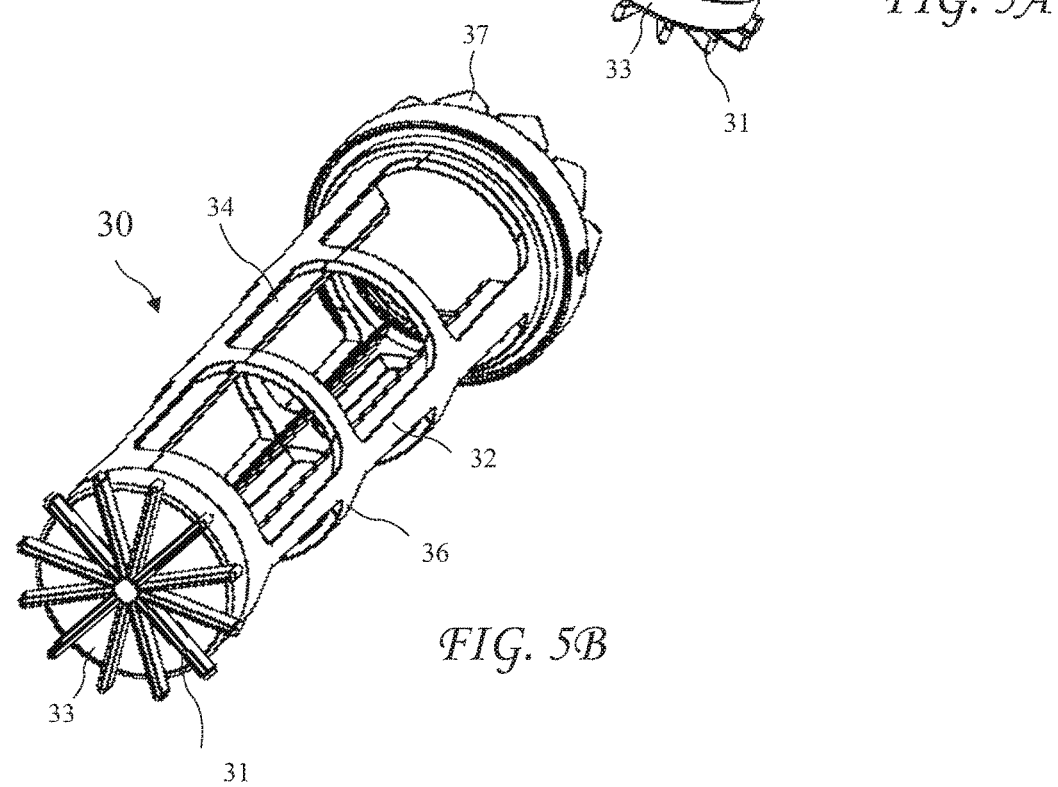
FIG. 5B

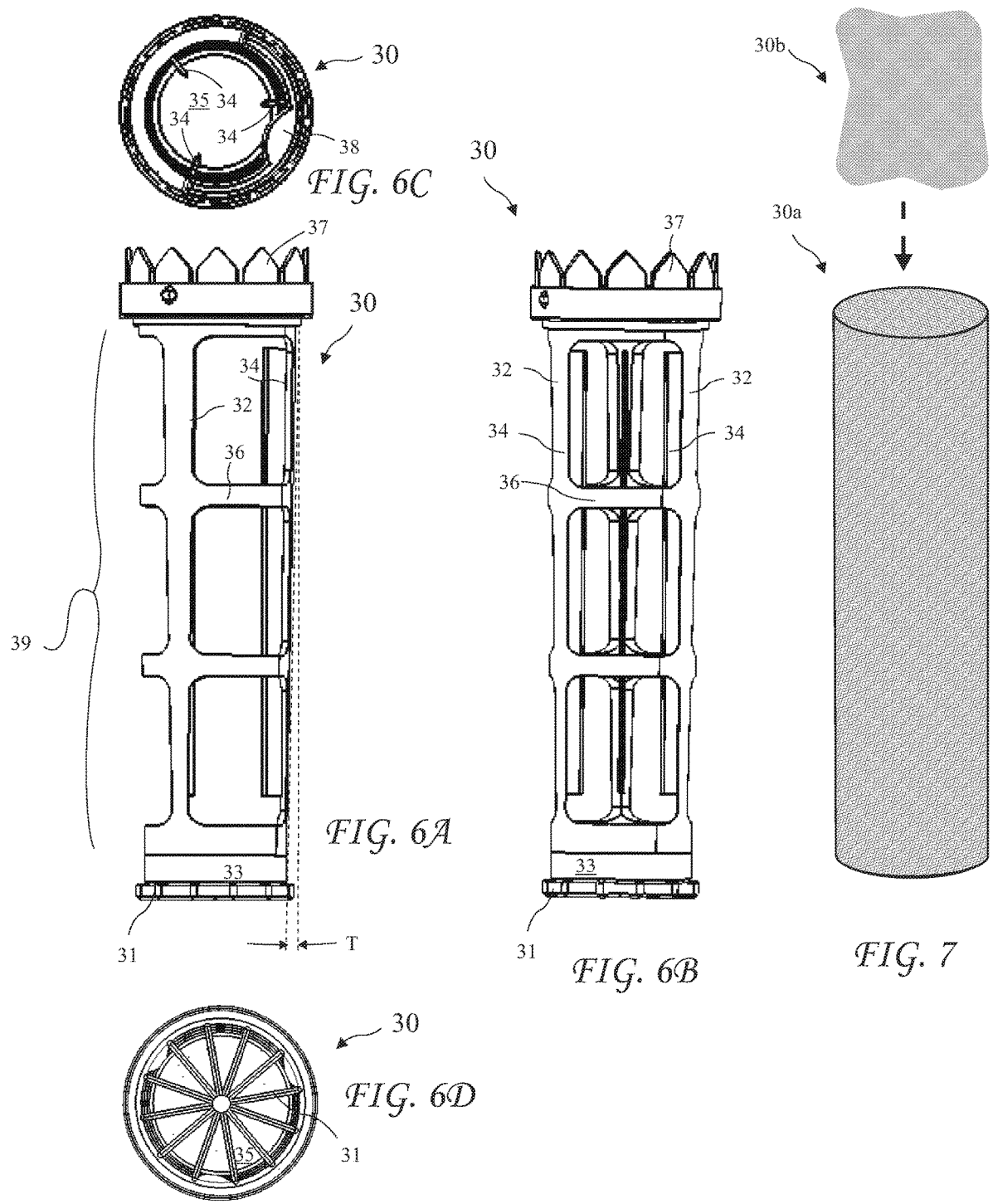

COLD COFFEE BREWER

BACKGROUND OF THE INVENTION

The present invention relates to beverage brewing and in particular to cold coffee brewing.

Some coffee drinkers prefer the flavor provided by cold brewing often referred to as steeping. Such cold brewing is provided by submerging a portion of brewing material in un-heated water for a period of time, for example ten hours, to complete brewing. While the steeping process may provide a desired result, the time required is excessive.

BRIEF SUMMARY OF THE INVENTION

The present invention addresses the above and other needs by providing a cold coffee brewing device which reduces the time required to produce cold brewed coffee. The cold brewer includes a container, preferably transparent, and an elongated brewing material holder suspended from a lid of the container. The brewing material holder is enclosed in a mesh to retain brewing material in the brewing material holder. In one embodiment, the mesh is a fine nylon mesh or a 75 micron opening nylon mesh. The lid includes a mechanism to rotate the brewing material holder. The container is filled with water and the brewing material holder is filled with brewing material. Movement of the brewing material submerged in water substantially reduces the time required for cold brewing.

In accordance with one aspect of the invention, there is provided a cold coffee brewing device including a brewing material holder immersed on water and a drive assembly to rotate the brewing material holder. The brewing material holder preferably oscillates at between 30 and 90 cycles per minutes and between 90 degrees and 270 degrees of rotation. Motion of the brewing material in the water reduced cold brewing time from as much as ten hours to as little as one hour.

In accordance with another aspect of the invention, there is provided a method for cold coffee brewing including pouring brewing material into a brewing material holder of a cold coffee brewer, positioning a drive assembly on a container lid of the cold coffee brewer, the vertical bars engaging the upward pointing triangular teeth to align the vertical bars with the upward pointing triangular teeth and mechanically rotationally couple the drive assembly to the brewing material holder, operating the drive assembly to oscillate the brewing material holder in an oscillating manner between 90 degrees and 270 degrees of rotation at a frequency between 30 and 90 cycles per minutes, waiting for the cold brewed coffee to be brewed, removing the drive assembly, and positioning a pouring lid on the container lid.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4 shows a side view of the cold coffee brewing device according to the present invention with a lid cover removed.

FIG. 5A shows a top and side view of a brewing material holder of the cold coffee brewing device according to the present invention.

FIG. 5B shows a bottom and side view of the brewing material holder of the cold coffee brewing device according to the present invention.

FIG. 6A shows a side view of the brewing material holder of the cold coffee brewing device according to the present invention.

FIG. 6B shows a second side view of the brewing material holder of the cold coffee brewing device according to the present invention.

FIG. 6C shows a top view of the brewing material holder of the cold coffee brewing device according to the present invention.

FIG. 6D shows a bottom view of the brewing material holder of the cold coffee brewing device according to the present invention.

FIG. 7 shows mesh material used to enclose the brewing material holder according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1A:
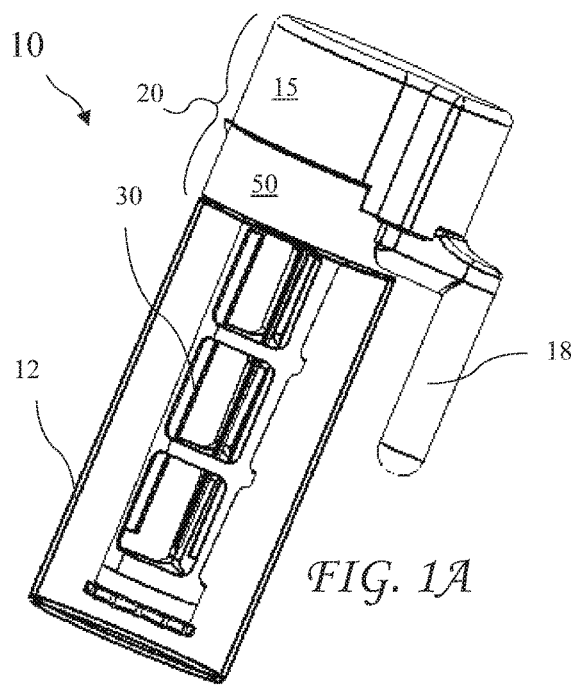
FIG. 1A shows a side view of a cold coffee brewing device according to the present invention.
Figure 1B:
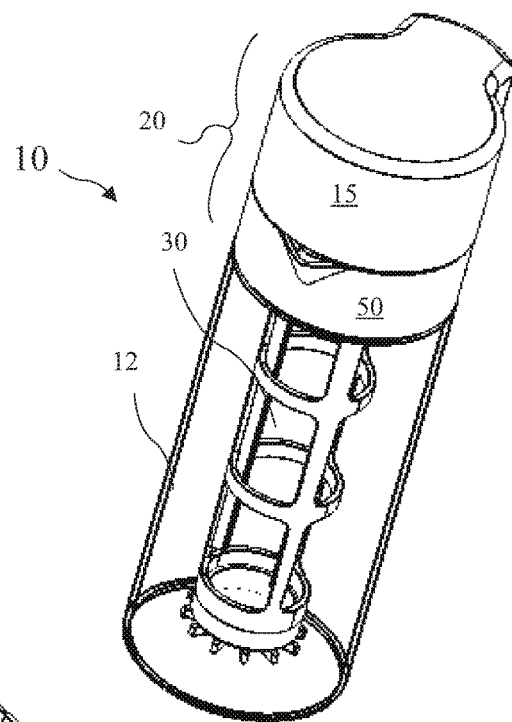
FIG. 1B shows a top and side view of the cold coffee brewing device according to the present invention.
Figure 1C:
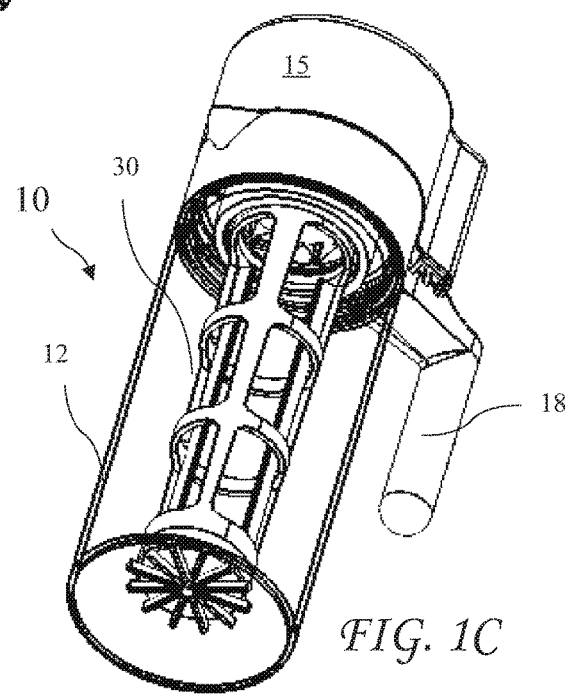
FIG. 1C shows a bottom and side view of the cold coffee brewing device according to the present invention.

A side view of a cold coffee brewing device 10 according to the present invention is shown in FIG. 1A, a top and side view of the cold coffee brewing device 10 is shown in FIG. 1B, and a bottom and side view of the cold coffee brewing device 10 is shown in FIG. 1C. The cold coffee brewing device 10 includes a container 12 for containing water during brewing, and an open mouth for attachment of a container cap 50 of a top 20. The container 12 is preferably transparent to allow viewing the water in the container 12 as the water darkens while brewing progresses. A brewing material holder 30 is suspended from the top 20 and the brewing material holder 30 is covered by a mesh material 30a (see FIG. 7). A handle 18 is attached to the top 20.

Figure 3B:
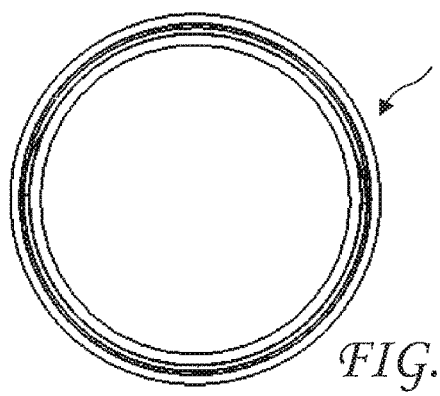
FIG. 3B shows a top view of the liquid container according to the present invention.
Figure 3A:
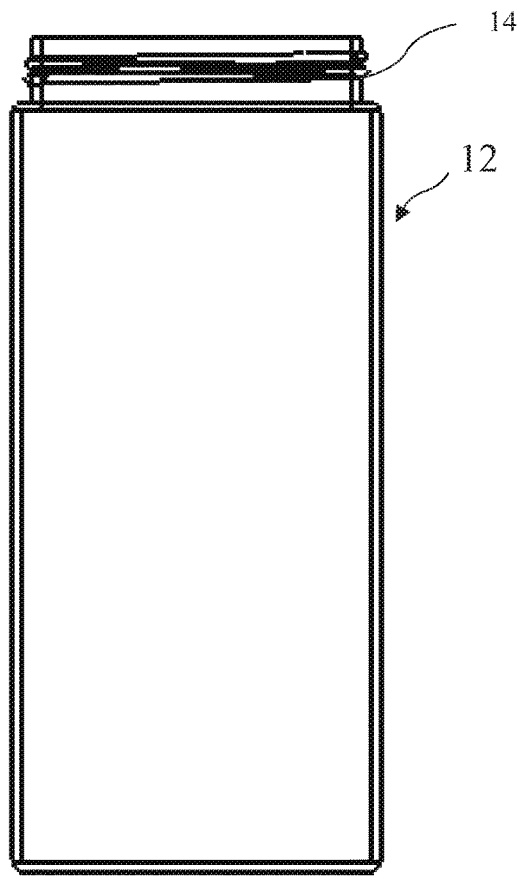
FIG. 3A shows a side view of the liquid container according to the present invention.
Figure 2:
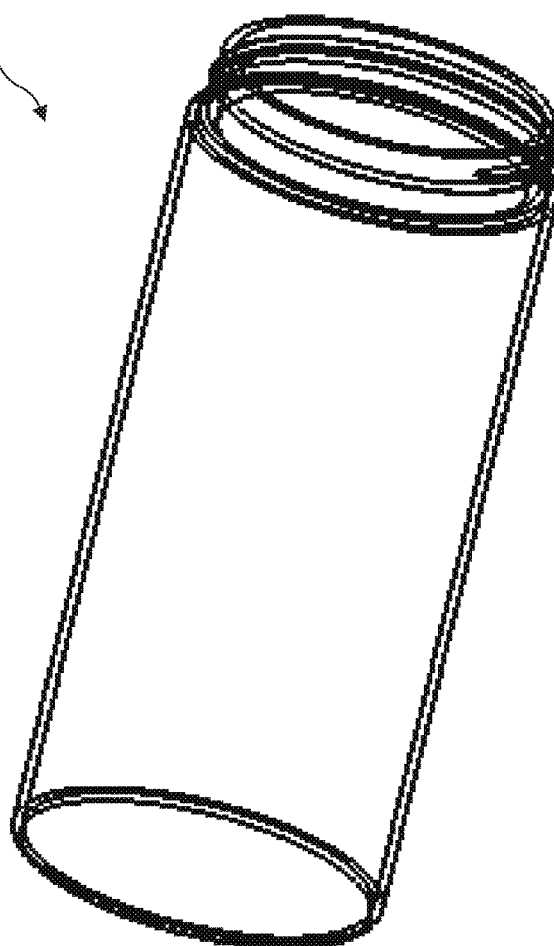
FIG. 2 shows a bottom and side view of a liquid container according to the present invention.
Figure 3C:
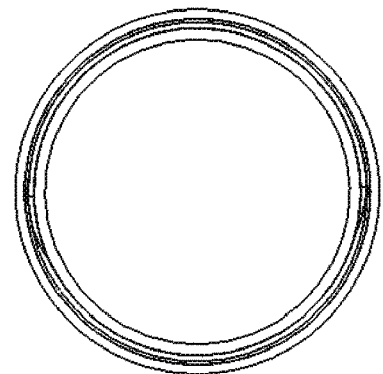
FIG. 3C shows a bottom view of the liquid container according to the present invention.

A bottom and side view of the liquid container 12 is shown in FIG. 2, a side view of the liquid container 12 is shown in FIG. 3A, a top view of the liquid container 12 is shown in FIG. 3B and, a bottom view of the liquid container 12 is shown in FIG. 3C. In one embodiment the liquid container 12 is made of glass, in another embodiment from plastic. The container 12 is preferably transparent to allow viewing the water in the container 12 as the water darkens while brewing progresses, but may be an opaque material without preventing function of the cold coffee brewing device 10. The container 12 includes closed sides and bottom and an open mouth 14 for attachment of the container cap 50, and is preferably generally cylindrical in shape. The open top 14 includes threads 14 for attaching the top 20. Those skilled in the art will recognize that other structure for attaching a lid to a bottle may be used and are intended to come within the scope of the present invention.

A side view of the cold coffee brewing device 10 with the lid cover 22 removed is shown on FIG. 4. A drive assembly 40 is contained in the top 20 and rotates the brewing material holder 30 during cold brewing.

A top and side view of a brewing material holder 30 of the cold coffee brewing device 10 is shown in FIG. 5A and a bottom and side view of the brewing material holder 30 is shown in FIG. 5B. The brewing material holder 30 includes a skeleton 39 (see FIG. 6A) comprising vertical members 32 and circular members 36. Blades 34 reaching into the interior of the skeleton 39 to urge brewing material to rotate with the brewing material holder 30. A bottom cap 33 is attached to the bottom of the skeleton 39, preferably threadedly attached. Fins 31 on the bottom of the bottom cap 33 reach down and provide mixing to the water in the container 12 as brewing progresses. The bottom cap 33 preferably provides a bottom plate 35 preventing escape of the brewing material from the brewing material holder 30. A holder handle 38 is pivotally attached at the top of the brewing material holder 30 by pivots 38a facilitates lifting of the brewing material hold 30 from the container 12.

A side view of the brewing material holder 30 is shown in FIG. 6A, a second side view of the brewing material holder 30 is shown in FIG. 6B, a top view of the brewing material holder 30 is shown in FIG. 6C, and a bottom view of the brewing material holder 30 is shown in FIG. 6D. Triangular teeth 37 point up from the brewing material holder 30 and engage vertical bars 48 (see FIG. 8B) of the drive assembly 40 to rotationally couple the brewing material holder 30 to the drive assembly 40.

A mesh covering 30a of the brewing material holder 30 is shown in FIG. 7. The mesh covering 30a is attached around the skeleton of the brewing material holder 30 preventing escape of brewing material 30b from the brewing material holder 30. Examples of suitable mesh materials are fine nylon mesh, 75 micron opening nylon mesh, metal mesh material, paper mesh material (e.g., filter paper). Those skilled in the art will recognize that other mesh material may be used, and a brewing material holder enclosed in such other mesh material are intended to come within the scope of the present invention.

Figure 8A:
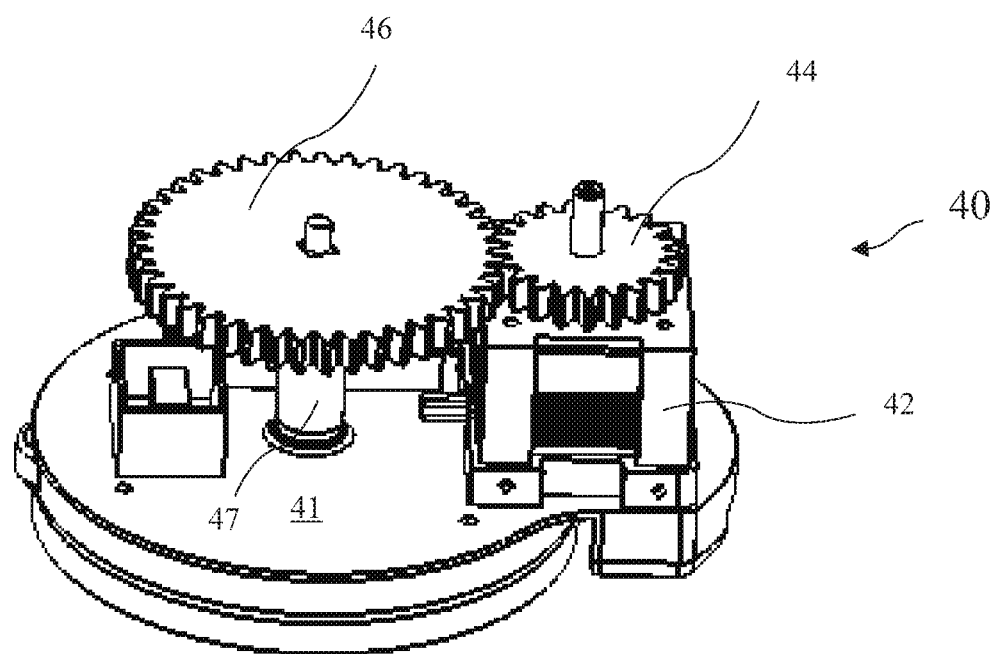
FIG. 8A shows a top and side view of a drive assembly according to the present invention.
Figure 8B:
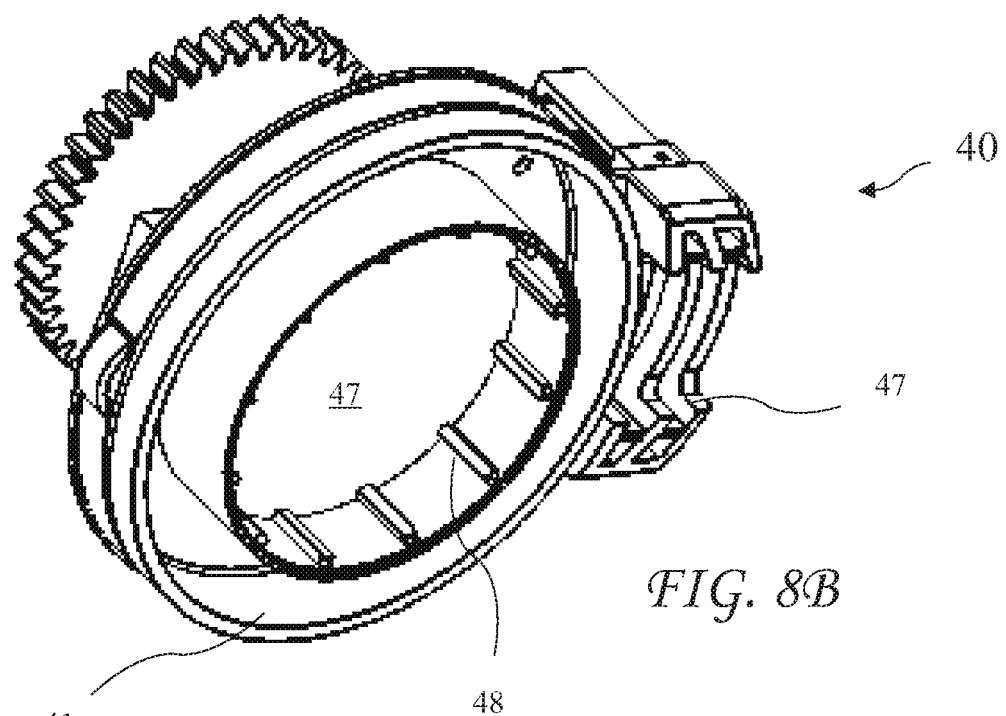
FIG. 8B shows a bottom and front view of the drive assembly according to the present invention.

A top and side view of a drive assembly 40 is shown in FIG. 8 and a bottom and front view of the drive assembly 40 is shown in FIG. 8B. The drive assembly 40 resides on top of the container cap 50. Lips 47 of the drive assembly 40 straddle a handle support 52 of the container cap 50 (see FIG. 9A) to rotationally fix the drive assembly 40. Rotation is preferably provided by a electric motor 42 through reduction gears 44 and 46. The drive assembly 40 includes a drive coupler 47 rotationally coupling the gear 46 to vertical bars 48 pointing down to engage the triangular teeth 37 (see FIG. 6A, 6B) of the brewing material holder 30 to rotationally couple the brewing material holder 30 to the drive assembly 40. The reduction gears 44 and 46 reduce the speed rotation of the brewing material holder 30. The rotational motion is preferably an oscillation of between 90 degrees and 270 degrees and preferably about 120 degrees, at a cycle of between 30 cycles per minute and 90 cycles per minute, and preferably about 60 cycles per minute. While preferred rates and rotation angles are provided here, those skilled in the art will recognize other combinations of rates and rotation angles useful for cold brewing, and a cold brewing device according to the present invention operating at other rates and rotation angles is intended to come within the scope of the present invention, and that the reduction gears may be replaced by a belt drive, and that present invention replacing the gears with a belt drive is intended to come within the scope of the present invention.

Figure 9A:
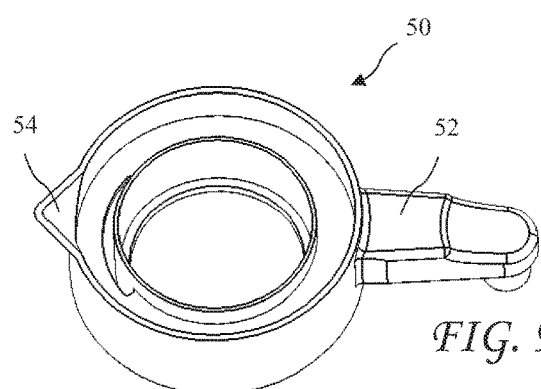
FIG. 9A shows a top and side view of a container cap according to the present invention.
Figure 9B:
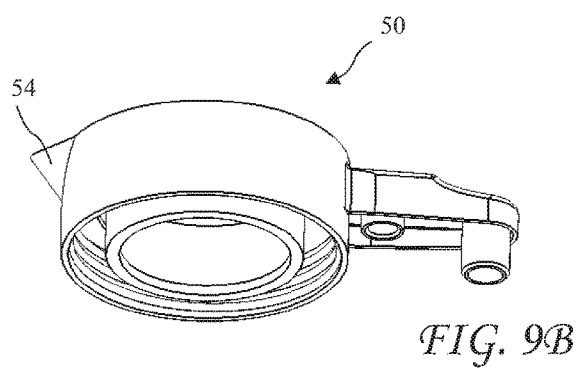
FIG. 9B shows a bottom and side view of the container cap according to the present invention.
Figure 9C:
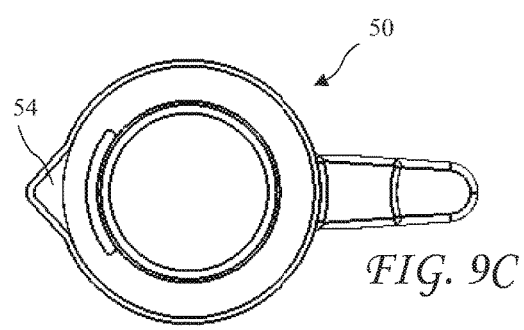
FIG. 9C shows a top plan view of the container cap according to the present invention.
Figure 10:
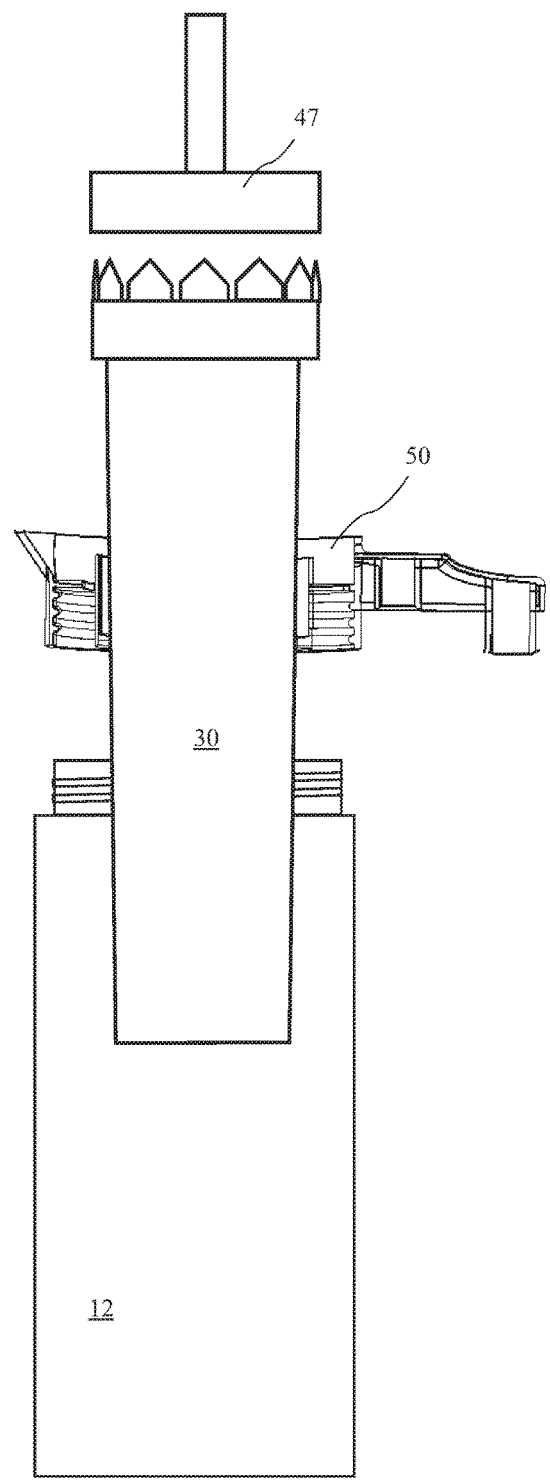
FIG. 10 shows an exploded view of the container, container cap, brewing material holder, and coupler of the cold coffee brewing device according to the present invention.

A top and side view of a container cap 50 of the cold coffee brewing device 10 is shown in FIG. 9A, a bottom and side view of the container cap 50 is shown in FIG. 9B, a top plan view of the container cap 50 is shown in FIG. 9C, and an exploded view of the container 12, container cap 50, brewing material holder 30, and coupler 47 of the cold coffee brewing device 10 is shown in FIG. 10. The container cap 50 engages the container during brewing and pouring. The brewing material holder 30 sides down through the container cap 50 into the container 12 and is supported by the container cap 50. The coupler 47 engages the brewing material holder 30 when the drive assembly 40 is placed onto the container cap 50 to rotate the brewing material holder 30 during brewing. A spout 54 facilitates pouring brewed drink from the cold coffee brewing device 10.

Figure 11A:
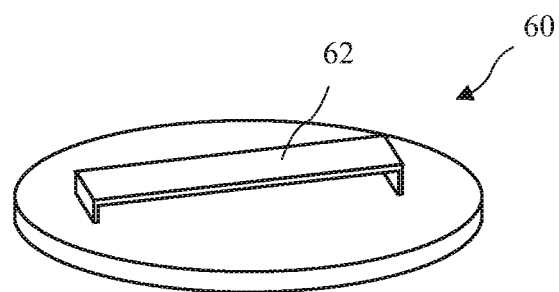
FIG. 11A shows a top view of a pouring lid of the cold coffee brewing device according to the present invention.
Figure 11B:
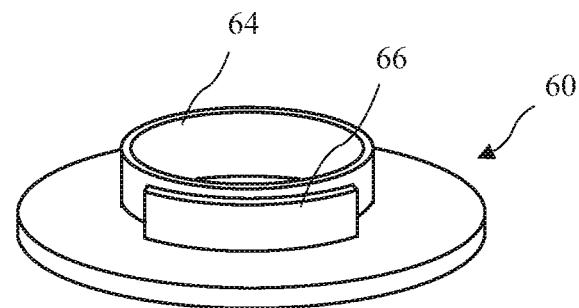
FIG. 11B shows a bottom view of the pouring lid of the cold coffee brewing device according to the present invention.

A top view of a pouring lid 60 of the cold coffee brewing device 10 is shown in FIG. 11A and a bottom view of the pouring lid 60 is shown in FIG. 11B. The pouring lid 60 replaces the drive assembly 40 after brewing brewed beverage. A lid handle 62 allows a user to remove the pouring lid 60. The pouring lid 60 can be rotated to align and separate a spout guard 66 from the spout 54 (see FIGS. 9A-9C).

While the invention herein disclosed has been described by means of specific embodiments and applications thereof, numerous modifications and variations could be made thereto by those skilled in the art without departing from the scope of the invention set forth in the claims.

I claim:
1. A cold coffee brewer comprising;
a container having an open top;
a container lid configured to cover the open top;
a brewing material holder configured to hold ground brewing material and to be suspended from the container lid and into an interior of the container:

a mesh material covering openings in a sidewall of the brewing material holder; and a drive assembly positionable on the container lid and configured to be mechanically coupled to and rotate the brewing material holder;

wherein the drive assembly includes an electric motor, wherein the drive assembly includes a coupler having spaced bars, and wherein the beverage material holder includes corresponding teeth configured to align and engage the bars to mechanically couple the drive assembly to the beverage material holder.

2. The cold coffee brewer of Claim 1, wherein the drive assembly includes an electric motor.

3. The cold coffee brewer of claim 2, wherein the drive assembly includes reduction gears configured to couple the electric motor to the brewing material holder.

4. The cold coffee brewer of claim 2, wherein the drive assembly includes a belt drive configured to couple the electric motor to the brewing material holder.

5. The cold coffee brewer of claim 1, wherein the teeth are generally triangular in shape.

6. The cold coffee brewer of Claim 1, wherein the drive assembly is configured to rotate the brewing material holder such that the brewing material holder oscillates in a range of between 90 degrees and 270 degrees of rotation at a frequency of between 30 and 90 cycles per minute.

7. The cold coffee brewer of claim 6, wherein the drive assembly is configured to rotate the brewing material holder such that the brewing material holder oscillates through about 120 degrees of rotation.

8. The cold coffee brewer of Claim 1, wherein the drive assembly is configured to rotate the brewing material holder such that the brewing material holder oscillates at a frequency of about 60 cycles per minute.

9. The cold coffee brewer of Claim 1, wherein the container is made from a transparent material.

10. The cold coffee brewer of Claim 1, wherein the mesh is selected from the group consisting of a 75-micron opening nylon mesh, a metal mesh, a paper mesh material, and filter paper.

11. The cold coffee brewer of claim 10, wherein the mesh is a metal mesh material.

12. The cold coffee brewer of claim 11, wherein the mesh is a 75-micron opening nylon mesh.

13. The cold coffee brewer of Claim 1, wherein the beverage material holder includes a skeleton frame comprising vertical members and connecting circular members.

14. The cold coffee brewer of claim 13, further comprising blades that project radially from the skeleton frame into an interior of the beverage material holder.

15. A cold coffee brewer, comprising:
a container having an open top;
a container lid configured to cover the open top;
a brewing material holder configured to hold ground brewing material and to be suspended from the container lid and into an interior of the container, having a sidewall with open regions;
a mesh material covering the open regions of the brewing material holder; and
a drive assembly positionable on the container lid and configured to be mechanically coupled to and rotate the brewing material holder in an oscillating manner;
wherein the drive assembly includes a coupler including spaced bars; and
wherein the beverage material holder includes corresponding teeth configured to align and engage the bars of the coupler to mechanically couple the drive assembly to the beverage material holder.

16. The cold coffee brewer of Claim 1, wherein the beverage material holder includes
a bottom cap, and
fins extending outward from an exterior of a bottom of the bottom cap.

17. A cold coffee brewer, comprising:
container means for holding liquid, having an open top;
cover means for covering the open top;
holding means for holding ground brewing material and for being suspended from the container lid and into an interior of the container means;
mesh means for covering openings in a sidewall of the holding means; and
drive means for mechanically coupling to and rotating the holding means, positionable on the container lid;
wherein the drive means includes coupling means including spaced bars; and
wherein the holding means includes corresponding teeth configured to align and engage the bars of the coupling means to mechanically couple the drive means to the holding means.

18. The cold coffee brewer of claim 17, wherein the drive means is a means for rotating the holding means in an oscillating manner.

19. The cold coffee brewer of claim 18, wherein the drive means includes an electric motor.

20. The cold coffee brewer of claim 18, wherein the teeth are generally triangular in shape.

\* \* \* \* \*